United States Patent [19]

Yagi et al.

[11] 4,075,449
[45] Feb. 21, 1978

[54] SWITCH WITH ELECTROLUMINESCENT INDICATOR

[75] Inventors: Hideaki Yagi, Kasugai; Tetsuo Hishiki, Nagoya, both of Japan

[73] Assignee: NGK Spark Plug Co. Ltd., Nagoya, Japan

[21] Appl. No.: 669,733

[22] Filed: Mar. 23, 1976

[30] Foreign Application Priority Data

June 30, 1975  Japan ............................ 50-91308[U]
July 8, 1975  Japan ............................ 50-94938[U]

[51] Int. Cl.² .................................................. H01H 9/16
[52] U.S. Cl. .................................. 200/315; 313/509; 337/79
[58] Field of Search ............................ 200/310-317; 337/79, 206, 241, 242, 265, 266, 332, 376; 313/509; 240/2 S; 116/124 L, DIG. 35, DIG. 28; 174/127

[56] References Cited

U.S. PATENT DOCUMENTS

| 2,015,698 | 10/1935 | Tiffany | 200/317 |
|---|---|---|---|
| 2,251,540 | 8/1941 | Buschbeck et al. | 174/127 |
| 2,702,329 | 2/1955 | Dietz, Jr. et al. | 337/265 |
| 3,247,414 | 4/1966 | Levetan | 313/509 X |
| 3,283,194 | 11/1966 | Rulon | 313/509 |
| 3,349,240 | 10/1967 | Brown | 313/509 X |
| 3,379,915 | 4/1968 | Sentementes et al. | 313/509 X |
| 3,573,532 | 4/1971 | Boucher | 313/509 |
| 3,735,077 | 5/1973 | Ohashi | 200/315 |
| 3,743,805 | 7/1973 | Guinan | 240/2 S |

Primary Examiner—J. V. Truhe
Assistant Examiner—D. A. Tone
Attorney, Agent, or Firm—Stevens, Davis, Miller & Mosher

[57] ABSTRACT

Electroluminescent elements comprising a ferroelectric sintered ceramic body as a substrate, a luminescent layer applied on the body, a transparent electrode layer applied on the luminescent layer and an electrode layer applied on other side of the body and having improved withstand voltage properties. The electroluminescent elements are suitable for the indication of location of switch members or the like at the switching-off condition.

13 Claims, 4 Drawing Figures

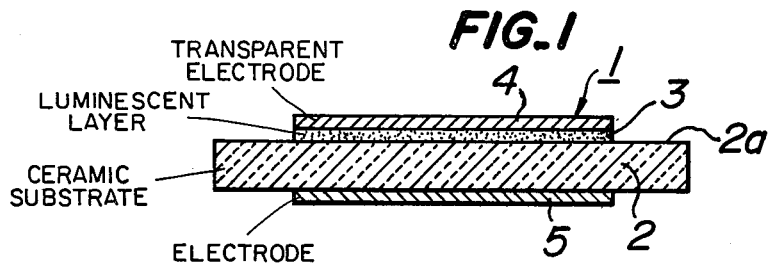
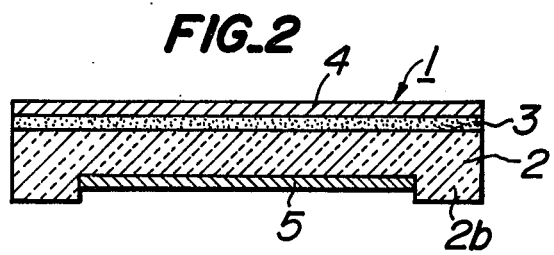
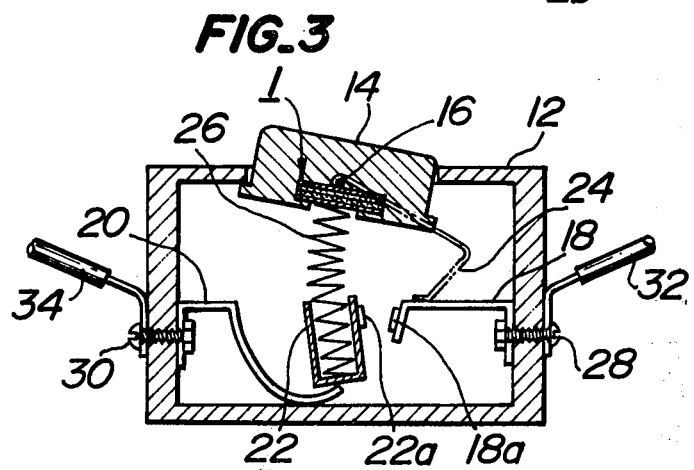
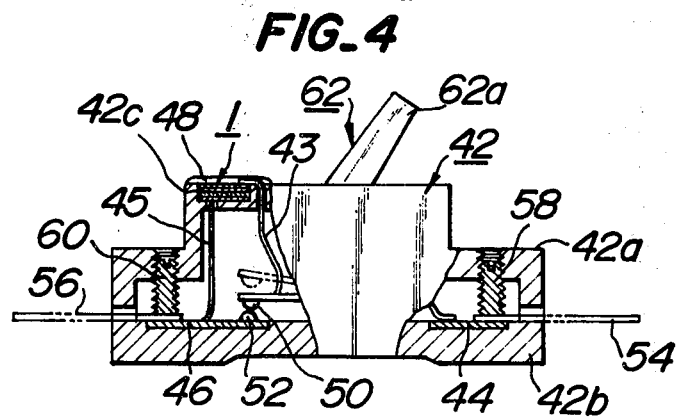

SWITCH WITH ELECTROLUMINESCENT INDICATOR

BACKGROUND OF THE INVENTION

1. Field of the Invention

The present invention relates to an electroluminescent element (hereinafter abbreviated as EL element), and more particularly relates to an electroluminescent element having improved voltage withstanding properties, which is suitable for position indication of a switch member or the like by bridging thereacross.

2. Description of the Prior Art

Hitherto, EL elements of various structures have been known. For instance, there are ones formed by successively applying an electrode layer, a dielectric layer, a luminescent layer and an electrode layer on an insulating substrate, or ones formed by, successively, a dielectric layer, a luminescent layer and an electrode layer on an electrically conductive substrate serving as another electrode layer. In these EL elements, porcelain enamel, a mixture of powdered titanate (e.g., barium titanate) and glass, and the like are usually used as the dielectric layer.

It has been known that the EL element of this type can be used as a position indicating lamp without particular difficulty as long as it is connected across voltage terminals of a power source as a load. However, one intends to use the EL element for the indication of switch members in lighting equipment by connecting the element in parallel between the switching contacts of a switch member and energizing it only under the switching-off condition of the switch member, a transient phenomenon is caused due to the presence of load inductance at the time of switching-off, so that higher voltage (2–3 KV) is applied to the element and it is apt to cause breakdown.

Therefore, it is desired to develop EL elements having higher voltage withstanding properties. For this purpose, it is known that a semiconductor layer is inserted between the dielectric layer and the electrode layer in order to improve the voltage withstanding properties without sacrifice of luminous intensity at a constant applied voltage. However, the thickness of the semiconductor layer is considerably large as compared with the thickness of the dielectric layer, so that there is a tendency to unduly increase the thickness of the EL element.

SUMMARY OF THE INVENTION

An object of the present invention is to solve the above mentioned drawbacks of the prior art and to provide electroluminescent elements having improved withstanding voltage properties without sacrifice of luminous intensity and, which are small and durable and suited for mass-production.

Another object of the present invention is to provide electroluminescent elements having improved stability and durability and, which are suitable for indication of switch members or the like by electrically connecting in parallel between the switching contacts or terminals and energizing only under the switching-off condition.

According to the invention, there is provided an electroluminescent element comprising a ferroelectric sintered ceramic body as a substrate, a luminescent layer applied on one side of the ceramic body, a transparent electrode layer applied on the luminescent layer, and another electrode layer applied on the other side of the ceramic body.

In another embodiment of the invention, luminescent layers may be simultaneously applied on both sides of the sintered ceramic body, and in this case both the electrode layers are made transparent.

As the ferroelectric sintered ceramic body, use may be made of titanates such as barium titanate, magnesium titanate, strontium titanate and the like; and mixtures of barium titanate with 1–50 mol% of other additives. Such additives include barium stannate, strontium stannate, calcium stannate, magnesium stannate, nickel stannate, calcium titanate and the like.

In general, it is preferable to produce an intimate and thin sheet of sintered ceramic body from the above raw material by a doctor blade method or the like. The resulting sintered ceramic bodies have higher voltage withstanding properties and intimate structures, and the specific dielectric constant is 50–100 times larger than that of the conventional porcelain enamel, and hence, they have much higher luminous intensity. In the production of the sintered ceramic body, a working step at higher temperature is required, however, generally it is sintered for mass production and the production steps of producing the EL element may be reduced.

As the luminescent layer, a luminous layer of zinc sulfide containing copper as a luminous center (ZnS:Cu) is usually used. As other examples of the luminous body applicable to the invention, there are ZnS:Cu·Cl, ZnS:Pb·Cu, ZnS:Al·Cu, ZnS:Mn·Cu, Zn(S)·(Se):Cu, Zn(S)·(Se):Cu·I and the like.

According to the invention, the electrically conductive materials used for the manufacture of conventional EL elements are used as the transparent electrode layer and include tin oxide, indium oxide, indium oxide fluoride and the like. Especially, it has been found that creeping discharge of the EL element can be prevented if an electrically conductive material having a sheet resistivity of $10^3$–$10^6$ $\Omega/\square$ is used as a non-transparent electrode layer. Therefore, ruthenium oxide is used as the non-transparent electrode layer because it satisfies the requirement on the sheet resistivity. Besides ruthenium oxide, silver paste, nickel paste, carbon paste and the like may be used as the non-transparent electrode layer. The formation of the electrode layer is carried out by a spraying method, a vapor depositing method, a coating method or the like.

BRIEF DESCRIPTION OF THE DRAWINGS

The invention will be described in detail with reference to the accompanying drawings, wherein:

FIGS. 1 and 2 are cross-sectional views of embodiments of electroluminescent elements according to the invention, respectively;

FIG. 3 is an enlarged cross-sectional view of an embodiment of a switch member using the electroluminescent element according to the invention, wherein the element is provided across the switch member and energized only under the switching-off condition to indicate the position of the switch member; and FIG. 4 is an enlarged cross-sectional view of an embodiment of a no-fuse circuit breaker using the electroluminescent element according to the invention, wherein the element is provided across the breaker and energized only under the switching-off condition to indicate the cut-off state of the breaker.

DESCRIPTION OF THE PREFERRED EMBODIMENT

In FIG. 1 there is shown the fundamental structure of the electroluminescent element according to the invention. The EL element 1 comprises a ferroelectric sintered ceramic body 2 of barium titanate as a substrate, a luminescent layer 3 of a powdered luminous body, and electrode layers 4 and 5.

The sintered ceramic body 2 is formed by shaping powdered barium titanate into a thin sheet of 0.9 mm thickness by a doctor blade method and then sintering the sheet at 1350° C. The luminescent layer 3 is composed of zinc sulfide containing copper as a luminous center and has a thickness of 20–40 $\mu$. The electrode layer 4 is a transparent tin oxide layer (thickness: 1000–7000 A) formed by spraying an aqueous $SnCl_2$ solution on the luminescent layer 3 heated at about 500° C in air. The electrode layer 5 is a ruthenium oxide layer (thickness: 10–30 $\mu$) formed by baking a paste of ruthenium oxide and glass on the back surface of the sintered ceramic body 2 at about 700° C during the formation of the luminescent layer 3.

In practical use, the EL element according to the invention is preferably covered with an insulating material having at least a transparent portion.

Then, the properties of the EL elements according to the invention are shown in the following table, provided that barium titanate and other material are used as the ferroelectric sintered ceramic body. For comparison, there are also shown the properties of the conventional EL elements using porcelain enamel or a ceramic mixture of powdered barium titanate and glass as the dielectric layer (thickness: 50 $\mu$).

| Dielectric layer | Flexural strength (Kg/cm²) | Specific dielectric constant at 25° C | Withstand break through voltage (KV) |
| --- | --- | --- | --- |
| BaTiO₃ sintered body | 500–1000 | 10000 | 4 |
| BaTiO₃ + 12 mol% BaSnO₃ sintered body | 500–1000 | 10000 | 4 |
| BaTiO₃ + 2 mol% MgSnO₃ sintered body | 500–1000 | 2000–3000 | 4 |
| Porcelain enamel (50% BaTiO₃ + 50% Glass) | 200–800 | 3–20 | 0.1–0.5 |
| Niobate glass ceramics (NaNb₂O₃ + SiO₂) | 500–1000 | 200–500 | 0.2–1 |

As can be seen from the above table, the specific dielectric constant and withstand breakthrough voltage of the EL element according to the invention are considerably higher than those of the conventional EL elements. Furthermore, it has been confirmed that the EL element according to the invention is much superior in the luminous intensity at a constant applied voltage to the conventional EL element.

In FIG. 1, the peripheral part of the ferroelectric sintered ceramic body 2 is extended outwardly over the peripheries of the electrode layers 4, 5 in a sufficient width to form an annular insulating portion 2a. This insulating portion may be optionally formed, if necessary.

As shown in FIG. 2, the peripheral part of the ferroelectric sintered ceramic body 2 may be extended downwardly from the periphery of the electrode layer 5 to form an insulating barrier 2b. In this case, creeping discharge can be prevented without changing the effective surface area of the EL element, whereby the voltage withstanding properties are improved. Alternatively, the insulating barrier 2b may be formed from a vitreous insulating material such as glass, thermosetting resin and the like instead of the sintered ceramic body. Thus, when the periphery of the electrode layer 5 is shorter than that of the sintered ceramic body 2 by about 1 mm, the vitreous insulating material is applied on the exposed surface of the sintered ceramic body 2 and over the surface of the electrode layer 5 on the order of about 1 mm from the periphery thereof to form the insulating barrier 2b. Thereby, the creeping discharge can be prevented without charging the effective surface area of the element.

In FIG. 3 there is shown an embodiment of applying the EL element according to the invention for indication of switch members. That is, the EL element shown in FIG. 1 is incorporated in an operation knob of the switch member to electrically connect in parallel between the switching contacts and to be energized only under the switching-off condition to indicate the position of the switch member.

Referring to FIG. 3, numeral 12 represents an insulating casing of the switch member having an opening at its upper surface. In this opening is arranged a transparent or semi-transparent rocking knob 14 made of a synthetic resin. The EL element 1 is embedded in the bottom of the rocking knob 14 to expose the electrode layer 5 of the element. The transparent electrode layer 4 of the element is electrically connected to a connection terminal 18 through a metal pin 16 and a flexible conductive strip 24. The metal pin 16 is embedded in the rocking knob to contact with the electrode layer 4 and extends outwardly from the knob along the rocking axis thereof. The conductive strip 24 receives the end of the metal pin 16 projecting from the knob at one end thereof and contacts with the connection terminal 18 at the other end. The connection terminal 18 is fixed at one end to the inner wall of the casing 12 with a screw 28 and provided with a stationary contact 18a at the other end.

The electrode layer 5 of the element is electrically connected to another connection terminal 20 through a metal spring 26 and a U-shaped metallic part 22. That is, the metal spring 26 is conductive and is inserted in the compressed state between the exposed surface of the electrode layer 5 embedded in the knob and the inner bottom portion of the metallic part 22 to make two stable curved forms, one of which being a left-side curved form under switching-off condition as shown in FIG. 3, and the other being a right-side curved form under switching-on condition. The metallic part 22 is rockably arranged on the one end of the connection terminal 20 in place and a movable contact 22a is provided on a side wall of the metallic part 22 at a position corresponding to the stationary contact 18a. The connection terminal 20 is also fixed at the other end to the inner wall of the casing 12 with a screw 30. Moreover, numerals 32 and 34 represent wires.

Under the switching-off condition as shown in FIG. 3, a current passes through a circuit of the wire 32, connection terminal 18, conductive strip 24, metal pin 16, EL element 1, metal spring 26, metallic part 22, connection terminal 20 and wire 34, so that the EL element 1 is energized to indicate the position of the rocking knob 14 in the switch member. In case of switching-on, the movable contact 22a keeps in contact with the stationary contact 18a, so that no current will pass through the EL element 1. Consequently, the EL element 1 is not energized under the switching-on condition of the switch member.

The switch member of the structure as shown in FIG. 3 has been confirmed to satisfy requirements according to the Japanese Industrial Standard (JIS C-8304), that is, an insulation resistance between terminals of more than 100 mΩ and withstand voltage of more than 1.5 KV at a rated voltage of 125 V in 1 minute, and to be safe and durable.

Moreover, EL elements formed by applying luminescent layers and transparent electrode layers on both sides of the sintered ceramic body are suitable for indication of switch members when the element is embedded in the long rocking knob projecting outwardly from the casing along the projecting direction.

Next, in FIG. 4 there is shown an embodiment of applying the EL element according to the invention for indication of no-fuse circuit breakers.

Referring to FIG. 4, numeral 1 represents an EL element having a structure shown in FIG. 1, and numeral 42 represents an insulation casing of the breaker composed of a cover body 42a and a base body 42b. The EL element 1 is housed in a recess 42c formed at a given position on the cover body 42a and covered with a transparent insulating layer 48 of a synthetic resin to protect the transparent electrode layer 4 from the outside.

The transparent electrode layer 4 is electrically connected to a terminal plate 44 through a conductor 43 and the electrode layer 5 is electrically connected to another terminal plate 46 through a conductor 45. The terminal plate 44 and 46 have movable contact 50 and stationary contact 52 at one end thereof, respectively. Moreover, numerals 54 and 56 represent wires and numerals 58 and 60 represent screws, respectively.

In FIG. 4, numeral 62 represents an operation member of a no-fuse circuit breaker having an outwardly projecting handle portion 62a, which is actuated by an electromagnet or a bimetallic element to reach a cut-off state when a current flows over a given current value.

In the no-fuse circuit breaker of this type, the movable contact 50 is shifted at a position shown by the dotted lines of FIG. 4 under the switching-off condition, so that a current passes through a circuit of wire 54, terminal plate 44, conductor 43, EL element 1, conductor 45, terminal plate 46 and wire 56, whereby the EL element 1 is energized to indicate the cut-off state of the breaker.

Furthermore, it is clear that the EL element according to the invention is, of course, applicable to cut-out circuit breakers (provided with fuse) because it is small and has high durability and voltage withstanding properties.

What is claimed is:

1. An electrical switch including an electro-luminescent element for visually indicating when the switch is in its OFF condition, comprising:
   an OFF-ON actuator mounted for pivotal movement between OFF and ON positions, switch contacts for connection to an external supply of electricity, and switching means actuatable by said actuator between OFF and ON conditions;
   said actuator including an electroluminescent element comprising a ferroelectric sintered ceramic substrate, a luminescent layer applied on one surface of said substrate, a transparent electrode layer applied over the surface of said luminescent layer, and another electrode on the opposite side of said substrate;
   said actuator being at least semi-transparent so that light from said luminescent layer may be seen outside of said switch and actuator;
   said electroluminescent element being electrically connected in parallel with said switching means so that current will flow through only one of them at any time, said luminescent layer thereby emitting light only when said switch is in its OFF condition.

2. An electrical switch as claimed in claim 1 wherein said ferroelectric sintered ceramic substrate is composed of barium titanate, magnesium titanate, strontium titanate or a mixture of barium titanate and an additive.

3. An electrical switch as claimed in claim 2, wherein said additive is selected from the group consisting of barium stannate, strontium stannate, calcium stannate, magnesium stannate, nickel stannate and calcium titanate.

4. An electrical switch as claimed in claim 1, wherein said luminescent layer is composed of a luminous body selected from the group consisting of ZnS:Cu, ZnS:Cu·Cl, ZnS:Pb·Cu, ZnS:Al·Cu, ZnS:Mn·Cu, Zn(S)·(Se):Cu and Zn(S)·(Se):Cu·I.

5. An electrical switch as claimed in claim 1, wherein said transparent electrode layer is composed of tin oxide, indium oxide or indium oxide fluoride.

6. An electrical switch as claimed in claim 1, wherein said another electrode layer has a sheet resistivity of $10^3 - 10^6$ Ω/□ and is composed of ruthenium oxide.

7. An electrical switch as claimed in claim 1, wherein on both surfaces of said ferroelectric sintered ceramic substrate are applied luminescent layers and transparent electrode layers, respectively.

8. An electrical switch as claimed in claim 1, wherein said ferroelectric sintered ceramic substrate comprises a peripheral part extended outwardly from the electrode layers in a sufficient width to form an annular insulating portion.

9. An electrical switch as claimed in claim 1, wherein said ferroelectric sintered ceramic substrate comprises a peripheral part extended beyond the electrode layer to form an insulating barrier.

10. An electrical switch as claimed in claim 1, wherein said ferroelectric sintered ceramic substrate is provided with a vitreous insulating layer on at least the surfaces thereof not covered by an electrode layer thereby forming an insulating barrier.

11. An electrical switch as claimed in claim 10, wherein said vitreous insulating layer is composed of glass or a thermosetting resin.

12. An electrical switch as claimed in claim 1, wherein said element is covered with an insulating material having at least a transparent portion.

13. An electrical switch as claimed in claim 1, wherein said electroluminescent element is embedded in the bottom of a transparent or semi-transparent synthetic resin rocking knob actuator, the transparent electrode layer of said element is contacted with a metal pin embedded in the knob and extendig outwardly along the rocking axis, and the other electrode layer of said element is exposed in the bottom of the knob.

* * * * *